US012339104B2

(12) United States Patent
Medved et al.

(10) Patent No.: US 12,339,104 B2
(45) Date of Patent: Jun. 24, 2025

(54) AEROSOL SELF-DEFENSE SPRAY CANISTER CONTAINER

(71) Applicant: Mace Security International, Inc., Cleveland, OH (US)

(72) Inventors: Gary Medved, Cleveland, OH (US); Patrick Brown, Cleveland, OH (US); Traian Mohan, Cleveland, OH (US)

(73) Assignee: MACE SECURITY INTERNATIONAL, INC., Cleveland, OH (US)

( * ) Notice: Subject to any disclaimer, the term of this patent is extended or adjusted under 35 U.S.C. 154(b) by 300 days.

(21) Appl. No.: 18/193,259

(22) Filed: Mar. 30, 2023

(65) Prior Publication Data

US 2023/0314106 A1 Oct. 5, 2023

Related U.S. Application Data

(60) Provisional application No. 63/362,276, filed on Mar. 31, 2022.

(51) Int. Cl.
*F41H 9/10* (2006.01)
*G08B 15/02* (2006.01)

(52) U.S. Cl.
CPC ............... *F41H 9/10* (2013.01); *G08B 15/02* (2013.01)

(58) Field of Classification Search
CPC .................................. F41H 9/10; G08B 15/02
See application file for complete search history.

(56) References Cited

U.S. PATENT DOCUMENTS

| | | | | |
|---|---|---|---|---|
| 3,602,399 | A * | 8/1971 | Litman | F41H 9/10 222/325 |
| 5,629,679 | A * | 5/1997 | Cranford | F41H 9/10 340/693.8 |
| 6,196,419 | B1 * | 3/2001 | Haney | B65D 83/386 222/325 |
| 7,641,353 | B2 * | 1/2010 | Kostal | F21V 21/0885 362/399 |
| 9,586,750 | B1 * | 3/2017 | Mangold | F41H 9/10 |
| 2010/0237098 | A1 * | 9/2010 | Kaufman | B65D 83/22 222/402.1 |
| 2014/0252028 | A1 * | 9/2014 | Lord | G08B 21/02 222/162 |
| 2021/0108879 | A1 * | 4/2021 | Clemons | F41B 11/643 |
| 2021/0199410 | A1 * | 7/2021 | Bogacz | B25G 1/102 |

* cited by examiner

*Primary Examiner* — Donnell A Long
(74) *Attorney, Agent, or Firm* — Calfee, Halter & Griswold LLP

(57) ABSTRACT

An aerosol self-defense spray canister container including a pistol grip shaped housing configured to house an aerosol self-defense spray canister. The housing defines a finger-receiving opening thorough which a user's pointer finger can securely grasp the container for use, and a grip handle around which one or more of the user's other fingers can grasp the container for use. The container also includes an aerosol dispenser housed within the housing and movable between an inactivated position and an activated position to selectively dispense an aerosol self-defense spray from the housed aerosol self-defense spray canister.

18 Claims, 3 Drawing Sheets

AEROSOL SELF-DEFENSE SPRAY CANISTER CONTAINER

This application claims the benefit of U.S. Application No. 63/362,276, filed Mar. 31, 2022, which is hereby incorporated herein by reference in its entirety.

TECHNICAL FIELD

The present disclosure relates generally to aerosol self-defense spray canisters, and more particularly to a customizable and reusable aerosol self-defense spray canister container.

BACKGROUND

Aerosol self-defense spray, such as pepper spray, is a common and effective form of non-lethal self-protection. Aerosol self-defense spray is typically packaged in a hand-held canister that is convenient to carry and easy to dispense. The canister houses a pressurized self-defense fluid with a nozzle for release of the fluid by engagement of a trigger. A user may carry the canister on their person, for example in a pocket of their clothing, or in a bag. Alternatively, a user may attach the canister to a keychain or other accessory such that the canister is readily accessible in case of an emergency. As carrying aerosol self-defense spray canisters as an accessory is becoming more popular, more people, both trained and untrained in the skill of self-protection are carrying such canisters. Accordingly, there is a risk that a user may accidentally dispense the aerosol self-defense spray toward themselves if the aerosol self-defense spray canister is deployed without care or attention.

SUMMARY

Described herein is a reusable aerosol self-defense spray canister container for securing an aerosol self-defense spray canister therein and dispensing an aerosol self-defense spray therefrom. The housing of the container has a pistol grip shape with a finger-receiving opening through which the user's pointer finger can securely grasp the container for use, as well as an ergonomic grip portion having at least one finger depression on which at least one of the user's other fingers may rest when the user is grasping the container. The container also includes a lock in the finger-receiving opening that the user must engage with their pointer finger before being able to dispense the aerosol self-defense spray from the housed aerosol self-defense spray canister. Due to the configuration of the finger-receiving opening and the ergonomic grip portion, as well as the lock in the finger-receiving opening, the user is only able to discharge the aerosol self-defense spray from the housed aerosol self-defense spray canister when the container is oriented in the correct direction (away from the user and toward the intended target). In particular, the finger-receiving opening is shrouded around its circumference to make it difficult and/or counterintuitive for a user to engage the lock while holding the apparatus aimed at themselves. In this way, the container is specifically configured to prevent the user from accidentally dispensing the aerosol self-defense spray toward themselves.

According to an aspect of this disclosure, an aerosol self-defense spray canister container includes a pistol grip shaped housing configured to house an aerosol self-defense spray canister. The housing defines a finger-receiving opening thorough which a user's pointer finger can securely grasp the container for use, and a grip handle around which one or more of the user's other fingers can grasp the container for use. The container also includes an aerosol dispenser housed within the housing and movable between an inactivated position and an activated position to selectively dispense an aerosol self-defense spray from the housed aerosol self-defense spray canister.

According to one or more paragraph(s) of this disclosure, the grip handle includes at least one finger depression.

According to one or more paragraph(s) of this disclosure, the finger-receiving opening is circular.

According to one or more paragraph(s) of this disclosure, the housing includes a receiving section configured to receive the aerosol self-defense spray canister, and a removable cap removably connected to the receiving section and configured to be removed from the receiving section to access the receiving section.

According to one or more paragraph(s) of this disclosure, the removable cap forms a bottom of the grip handle of the housing when connected to the receiving section.

According to one or more paragraph(s) of this disclosure, the removable cap includes at least one resilient arm extending from the removable cap, having at least one arm projection at a distal end thereof. The resilient arm is configured to be received in the receiving section when the removable cap is attached to the receiving section.

According to one or more paragraph(s) of this disclosure, the receiving section includes at least one removable cap recess formed on a side wall of the receiving section, and the at least one arm projection is configured to engage with the at least one removable cap recess.

According to one or more paragraph(s) of this disclosure, the removable cap includes a keyring attachment.

According to one or more paragraph(s) of this disclosure, the housing is formed in two mirrored shell halves that each have a cavity for containing the housed aerosol self-defense spray canister and the aerosol dispenser.

According to one or more paragraph(s) of this disclosure, the two mirrored shell halves of the housing fit together with a snap fit.

According to one or more paragraph(s) of this disclosure, the two mirrored shell halves of the housing fit together with an interference fit.

According to one or more paragraph(s) of this disclosure, the aerosol dispenser includes an activator button accessible by the user from an outside of the housing and configured to be pressed by the user to dispense the aerosol self-defense spray, a nozzle connected to the activator button and configured to be moved into pressurized fluid connection with the aerosol self-defense spray canister to receive the aerosol self-defense spray when the activator button is pressed by the user, and a spray tube fluidly connected to the nozzle and configured to direct the aerosol self-defense spray received by the nozzle out of the housing.

According to one or more paragraph(s) of this disclosure, the aerosol dispenser includes a lock connected to the activator button for selectively preventing the aerosol dispenser from moving from the inactivated position to the activated position.

According to one or more paragraph(s) of this disclosure, the lock includes a resilient locking lever extending from the activator button and having a locking projection at a distal end thereof.

According to one or more paragraph(s) of this disclosure, the locking lever is biased in a locked position, in which the locking projection is engaged with a locking recess provided on an inner side wall of the housing, such that the activation button is prevented from being pressed downward by the user.

According to one or more paragraph(s) of this disclosure, the lock further includes an unlocking button connected to and extending out from the locking lever to an outside of the housing in the finger-receiving opening.

According to one or more paragraph(s) of this disclosure, the unlocking button is configured to move the locking lever from the locked position to an unlocked position, in which the locking projection is not engaged with the locking recess, when the unlocking button is pressed by the user such that the activation button may be pressed downward by the user.

According to one or more paragraph(s) of this disclosure, when the activator button is pressed downward, the aerosol dispenser is moved from the inactivated position to the activated position and the nozzle is commensurately moved into pressurized fluid connection with the aerosol self-defense spray in the housed aerosol self-defense spray canister, thereby dispensing the aerosol self-defense spray from the aerosol self-defense spray canister out of the container.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

Figure 1:
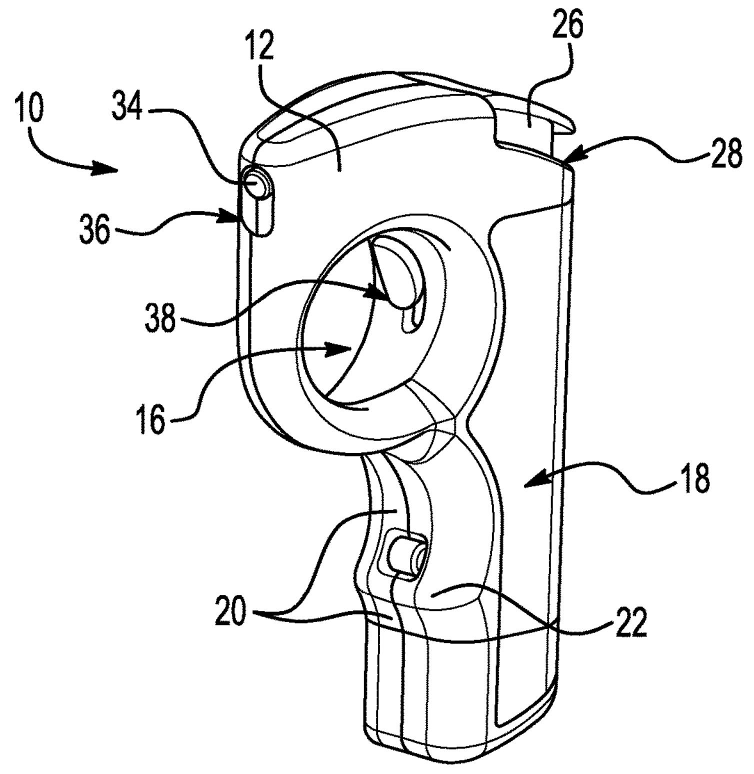
FIG. 1 is a perspective view of an aerosol self-defense spray canister container.
Figure 2:
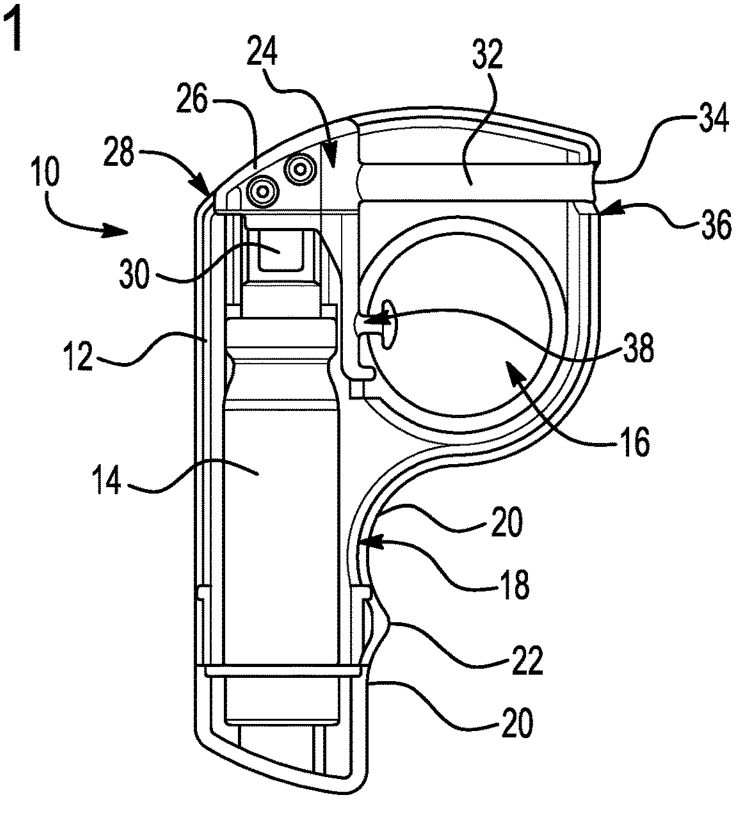
FIG. 2 is a side cross-sectional view of an aerosol self-defense spray canister container.
Figure 3:
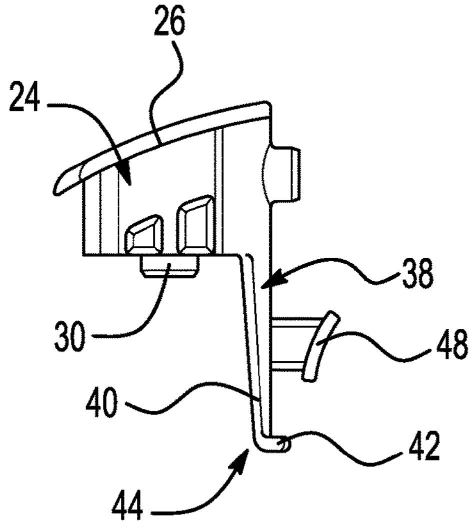
FIG. 3 is a side view of an aerosol dispenser in an aerosol self-defense spray canister container.
Figure 4:
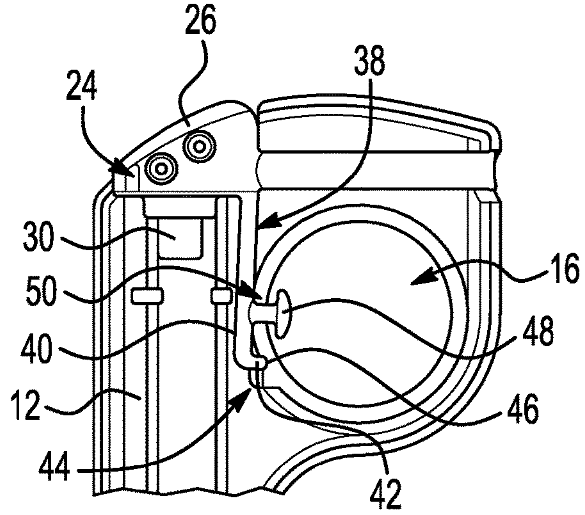
FIG. 4 is a cross-sectional view of an aerosol dispenser in an aerosol self-defense spray canister container.
Figure 5:
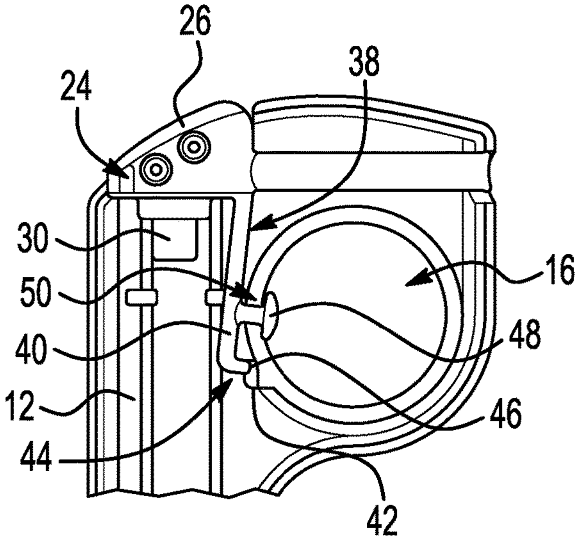
FIG. 5 is another cross-sectional view of an aerosol dispenser in an aerosol self-defense spray canister container.

With reference to FIGS. 1 and 2, an aerosol self-defense spray canister container 10 ("container 10") is depicted. The container 10 includes a pistol grip shaped housing 12 configured to house an aerosol self-defense spray canister 14. The housing 12 defines a finger-receiving opening 16 into which one of a user's fingers (e.g., pointer finger) can be received for securely grasping the container 10 for use, and a grip handle 18 around which one or more of the user's other fingers can grasp the container 10 for use. Specifically, the finger-receiving opening 16 may be circular in shape, as depicted, or may have any other shape suitable for receiving the user's finger. The grip handle 18 may include at least one finger depression 20 formed thereon for the one or more of the user's fingers to rest when the user is grasping the grip handle 18. For example, as depicted, the grip handle 18 may include two finger depressions 20 with a finger ridge 22 formed therebetween. However, it is understood that the grip handle 18 may include more than two finger depressions 20 and more than one finger ridge 20. The finger-receiving opening 16 and the grip handle 18 are both configured to facilitate an ergonomic grip on the housing 12 of the container 10 by the user when grasping the container 10 for use.

The container 10 also includes an aerosol dispenser 24 housed within the housing 12 and movable between an inactivated position and an activated position to selectively dispense an aerosol self-defense spray from the housed aerosol self-defense spray canister 14. The aerosol dispenser 24 includes an activator button 26 accessible by the user from an outside of the housing 12 through a top opening 28 in the housing 12, with which the user can move the aerosol dispenser 24 from the inactivated position to the activated position by pressing the activator button 26 downward with one of their fingers (e.g., thumb), to dispense an aerosol self-defense spray from the housed aerosol self-defense spray canister 14. The activator button 26 may have a finger depression formed on a surface thereof for easy identification and ergonomic engagement by the user's finger. The aerosol dispenser 24 also includes nozzle 30 connected to the activator button 26 and configured to be moved downward commensurately with the activator button 26 as the aerosol dispenser 24 is moved from the inactivated position to the activated position. When moved downward as the activator button 26 is pressed by the user and the aerosol dispenser 24 is moved from the inactivated position to the activated position, the nozzle 30 is configured to move into pressurized fluid connection with the housed aerosol self-defense spray canister 14 and receive the aerosol self-defense spray from the housed aerosol self-defense spray canister 14. The aerosol dispenser 24 may also include a spray tube 32 fluidly connected to the nozzle 30 and extending to a front opening 36 of the housing 12. The spray tube 32 is configured to direct the aerosol self-defense spray received by the nozzle 30 out of the housing 12 at the front opening 36 through an exit aperture 34 of the spray tube 32.

Figure 6:
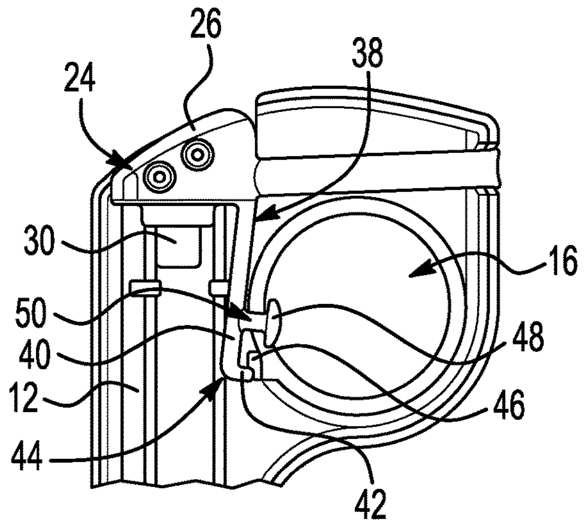
FIG. 6 is another cross-sectional view of an aerosol dispenser in an aerosol self-defense spray canister container.

With reference to FIGS. 3-6, the aerosol dispenser 24 also includes a lock 38 connected to the activator button 26 and configured to selectively prevent the aerosol dispenser 24 from moving from the inactivated position (FIGS. 4 and 5) to the activated position (FIG. 6). The lock 38 includes a resilient locking lever 40 extending from the activator button 26 and having a locking projection 42 at a distal end 44 thereof. The locking lever 40 is biased in a locked position (FIG. 4), in which the locking projection 42 is engaged with a locking recess 46 provided on an inner side wall of the housing 12, such that the activation button 26 is prevented from being pressed downward by the user and the aerosol dispenser 24 is prevented from moving from the inactivated position (FIGS. 4 and 5) to the activated position (FIG. 6).

For example, the locking recess 46 may be provided on an inner side wall of the housing 12 near the finger-receiving opening 16, as depicted, or may otherwise be provided on an inner side wall of the housing 12 near the grip handle 18. The lock 38 also includes an unlocking button 48 connected to and extending out from the resilient locking lever 40 to an outside of the housing 12 in the finger-receiving opening 16, through an unlocking opening 50 in the housing 12. That is, the unlocking opening 50 in the housing 12 is provided in the side wall of the housing 12 near the finger-receiving opening 16. The unlocking button 48 is therefore accessible by the user with one of the user's fingers (e.g., pointer finger) when the user is correctly grasping the container 10 and the one of the user's fingers (e.g., pointer finger) is received in the finger-receiving opening 16. The locking lever 40 is therefore configured to be moved from the locked position (FIG. 4) to the unlocked position (FIG. 5) when the user engages the unlocking button 48 with their finger (e.g., pointer finger) and presses the unlocking button 48 to disengage the locking projection 42 from the locking recess 46.

When the locking lever 40 is in the unlocked position (FIG. 5), the aerosol dispenser 24 may be moved from the inactivated position (FIGS. 4 and 5) to the activated position (FIG. 6). That is, when the locking lever 40 is in the unlocked position (FIG. 5), a user may press the activator button 26 downward, as the locking projection 42 is no longer engaged with the locking recess 46 and preventing the movement of the aerosol dispenser 24. As the activator button 26 is pressed downward, the aerosol dispenser 24 is moved from the inactivated position (FIGS. 4 and 5) to the activated position (FIG. 6), thereby commensurately moving the nozzle 30 into pressurized fluid connection with the aerosol self-defense spray in the housed aerosol self-defense spray canister 14. As described earlier, when the nozzle 30 is moved into pressurized fluid connection with the aerosol self-defense spray in the housed aerosol self-defense spray canister 14, the aerosol self-defense spray may be dispensed from the container.

In one embodiment, the lock 38 is configured, not to absolutely prevent the aerosol dispenser 24 from moving from the inactivated position (FIGS. 4 and 5) to the activated position (FIG. 6), but to merely make it more difficult for aerosol dispenser 24 from moving from the inactivated position (FIGS. 4 and 5) to the activated position (FIG. 6) when the activator button 26 is pressed. The locking projection 42 may be engaged with the locking recess 46 and the locking projection 42 and/or the locking recess 46 may be shaped so that a first amount of force exerted on the activator button 26 downward does not disengage the locking projection 42 from the locking recess 46 but a second amount of force (larger than the first amount of force) exerted on the activator button 26 downward releases the locking projection 42 from the locking recess 46 thereby actuating the aerosol dispenser 24 even when the unlocking button 48 has not been pressed.

Figure 7:
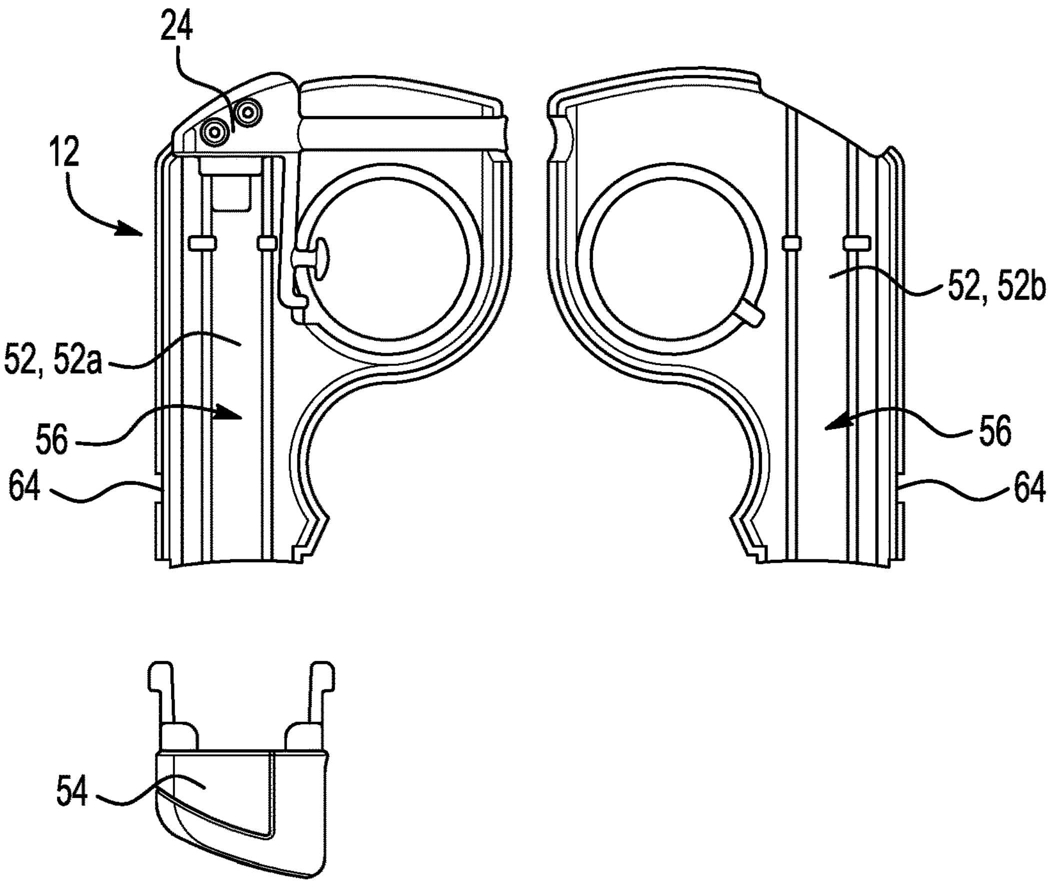
FIG. 7 is a cross-sectional exploded view of an aerosol self-defense spray canister container.
Figure 8:
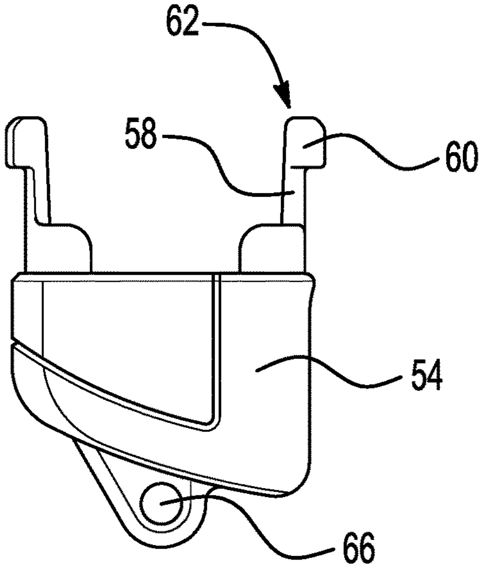
FIG. 8 is a side view of a removable cap of an aerosol self-defense spray canister container.

With reference to FIGS. 7 and 8, the configuration of the housing 12 will be described in more detail. The housing 12 includes a receiving section 52, in which the aerosol self-defense spray canister 14 may be received and housed and in which the aerosol dispenser 24 may be configured, and a removable cap 54 for accessing the receiving section 52. For example, the removable cap 54 may form a bottom of the grip handle 18 of the housing 12 when connected to the receiving section 52 of the housing 12. The receiving section 52 may be formed in two mirrored shell halves 52*a*, 52*b* that each have a cavity 56 for containing the housed aerosol self-defense spray canister 14 and the aerosol dispenser 24, and that fit together with a snap fit or interference fit. Other means may be provided for securing the two mirrored shell halves 52*a*, 52*b* together.

The removable cap 54 may be formed as a single piece configured to connect to the receiving section 52, for example when the two mirrored shell halves 52*a*, 52*b* are fit together. The removable cap 54 may therefore include at least one resilient arm 58 extending from the removable cap 54 and having at least one arm projection 60 at a distal end 62 thereof. The at least one resilient arm 58 of the removable cap 54 is configured to be received in the receiving section 52 when the removable cap 54 is attached to the receiving section 52. The receiving section 52 may include at least one removable cap recess 64 formed on at least one side wall of the receiving section 52 into which at least one arm projection 60 of the removable cap 54 engages and secures, via snap fit or interference fit, for example, when the removable cap 54 is connected to the receiving section 52. In this manner, when a user wishes to connect the removable cap 54 to the receiving section 54, after inserting the housed aerosol self-defense spray canister 14 for example, the user simply inserts the at least one resilient arm 58 into the receiving section 52 and pushes the removable cap 54 until the at least one arm projection 60 engages and secures in the at least one removable cap recess 64. When a user wishes to remove the removable cap 54 from the receiving section 52, for example to remove the housed aerosol self-defense spray canister 14, the user may press on the at least one arm projection 58 from an outside of the housing 12 through the at least one at least one removable cap recess 64 to disengage and unsecure the at least one arm projection 60 from the at least one removable cap recess 64 so that the removable cap 54 may be disconnected from the receiving section 52.

As depicted in FIG. 8, the removable cap 54 may also include a keyring attachment 66 formed on a bottom surface of the removable cap 54 for convenient attachment to a keyring. The keyring attachment 66 may be formed as an integral part with the removable cap 54 and may include a through hole extending therethrough for attachment to a keyring. It will be understood, however, that the keyring attachment 66 may have another shape and may be provided on another surface of the removable cap 54 or the housing 12 altogether.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. An aerosol self-defense spray canister container comprising:

a pistol grip shaped housing configured to house an aerosol self-defense spray canister, wherein the housing defines: a finger-receiving opening thorough which a user's pointer finger can securely grasp the container for use, and a grip handle around which one or more of the user's other fingers can grasp the container for use;

an aerosol dispenser housed within the housing and actuatable from an outside of the housing by the user's thumb, the aerosol dispenser being movable between an inactivated position and an activated position to selectively dispense an aerosol self-defense spray from the housed aerosol self-defense spray canister; and a lock operatively connected to the aerosol dispenser and configured to variably resist the aerosol dispenser from moving from the inactivated position to the activated position, the lock being actuatable by the user's pointer finger from inside the finger-receiving opening.

2. The aerosol self-defense spray canister according to claim 1, wherein the grip handle includes at least one finger depression.

3. The aerosol self-defense spray canister according to claim 1, wherein the finger-receiving opening is circular.

4. The aerosol self-defense spray canister according to claim 1, wherein the housing includes a receiving section configured to receive the aerosol self-defense spray canister, and a removable cap removably connected to the receiving section and configured to be removed from the receiving section to access the receiving section.

5. The aerosol self-defense spray canister according to claim 4, wherein the removable cap forms a bottom of the grip handle of the housing when connected to the receiving section.

6. The aerosol self-defense spray canister according to claim 1, wherein the removable cap includes at least one resilient arm extending from the removable cap, having at least one arm projection at a distal end thereof, wherein the resilient arm is configured to be received in the receiving section when the removable cap is attached to the receiving section.

7. The aerosol self-defense spray canister according to claim 6, wherein the receiving section includes at least one removable cap recess formed on a side wall of the receiving section, and the at least one arm projection is configured to engage with the at least one removable cap recess.

8. The aerosol self-defense spray canister according to claim 4, wherein the removable cap includes a keyring attachment.

9. The aerosol self-defense spray canister according to claim 1, wherein the housing is formed in two mirrored shell halves that each have a cavity for containing the housed aerosol self-defense spray canister and the aerosol dispenser.

10. The aerosol self-defense spray canister according to claim 9, wherein the two mirrored shell halves of the housing fit together with a snap fit.

11. The aerosol self-defense spray canister according to claim 9, wherein the two mirrored shell halves of the housing fit together with an interference fit.

12. The aerosol self-defense spray canister according to claim 1, wherein the aerosol dispenser includes:

an activator button accessible by the user from an outside of the housing and configured to be pressed by the user to dispense the aerosol self-defense spray;

a nozzle connected to the activator button and configured to be moved into pressurized fluid connection with the aerosol self-defense spray canister to receive the aerosol self-defense spray when the activator button is pressed by the user; and a spray tube fluidly connected to the nozzle and configured to direct the aerosol self-defense spray received by the nozzle out of the housing.

13. The aerosol self-defense spray canister according to claim 12, wherein the lock is connected to the activator button for selectively preventing the aerosol dispenser from moving from the inactivated position to the activated position.

14. The aerosol self-defense spray canister according to claim 13, wherein the lock includes a resilient locking lever extending from the activator button and having a locking projection at a distal end thereof.

15. The aerosol self-defense spray canister according to claim 14, wherein the locking lever is biased in a locked position, in which the locking projection is engaged with a locking recess provided on an inner side wall of the housing, such that the activation button is prevented from being pressed downward by the user.

16. The aerosol self-defense spray canister according to claim 15, wherein the lock further includes an unlocking button connected to and extending out from the locking lever to an outside of the housing in the finger-receiving opening.

17. The aerosol self-defense spray canister according to claim 16, wherein the unlocking button is configured to move the locking lever from the locked position to an unlocked position, in which the locking projection is not engaged with the locking recess, when the unlocking button is pressed by the user such that the activation button may be pressed downward by the user.

18. The aerosol self-defense spray canister according to claim 12, wherein when the activator button is pressed downward, the aerosol dispenser is moved from the inactivated position to the activated position and the nozzle is commensurately moved into pressurized fluid connection with the aerosol self-defense spray in the housed aerosol self-defense spray canister, thereby dispensing the aerosol self-defense spray from the aerosol self-defense spray canister out of the container.

* * * * *